(12) United States Patent
Liphardt

(10) Patent No.: US 10,209,528 B1
(45) Date of Patent: Feb. 19, 2019

(54) OPERATION OF AN ELECTROMAGNETIC RADIATION FOCUSING ELEMENT

(71) Applicant: J.A. WOOLLAM CO., INC., Lincoln, NE (US)

(72) Inventor: Martin M. Liphardt, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

(21) Appl. No.: 14/545,713

(22) Filed: Jun. 9, 2015

(51) Int. Cl.
*G01J 4/00* (2006.01)
*G02B 27/09* (2006.01)
*G02B 5/20* (2006.01)
*G01J 4/04* (2006.01)

(52) U.S. Cl.
CPC ............ *G02B 27/0988* (2013.01); *G01J 4/04* (2013.01); *G02B 5/205* (2013.01)

(58) Field of Classification Search
CPC ........................................................ G01J 4/00
USPC .......................................................... 356/367
See application file for complete search history.

(56) References Cited

U.S. PATENT DOCUMENTS

| 4,650,279 | A | | 3/1987 | Magee | 385/116 |
| 4,832,464 | A | | 5/1989 | Kato et al. | 359/19 |
| 5,336,885 | A | | 8/1994 | Rose et al. | 250/305 |
| 5,579,161 | A | * | 11/1996 | Sekiguchi | G02B 27/0101 359/559 |
| 5,828,446 | A | * | 10/1998 | Davis | G01M 11/0214 356/124 |
| 5,847,877 | A | * | 12/1998 | Imamura | G02B 5/1876 359/566 |
| 5,859,424 | A | | 1/1999 | Norton | 250/226 |
| 5,864,139 | A | * | 1/1999 | Reffner | G01N 21/35 250/339.05 |
| 5,889,593 | A | | 3/1999 | Bareket | 356/445 |
| 6,227,938 | B1 | | 5/2001 | Cheetham et al. | 451/6 |
| 6,449,028 | B1 | | 9/2002 | Grupp et al. | 349/191 |
| 6,456,435 | B1 | * | 9/2002 | Cobb | G02B 26/10 359/577 |
| 6,636,309 | B1 | | 10/2003 | Johs et al. | 356/369 |
| 6,738,138 | B2 | | 5/2004 | Wei | 356/369 |
| 6,824,812 | B2 | | 11/2004 | Lill et al. | 427/8 |
| 6,865,025 | B2 | | 3/2005 | Kimura | 395/565 |
| 6,916,584 | B2 | | 7/2005 | Sreenivasan et al. | 430/22 |
| 6,940,595 | B1 | | 9/2005 | Johs et al. | 356/369 |
| 6,994,808 | B2 | | 2/2006 | Lee et al. | 264/1.21 |

(Continued)

FOREIGN PATENT DOCUMENTS

JP  2003-91862  3/2003

*Primary Examiner* — Roy M Punnoose
(74) *Attorney, Agent, or Firm* — James D. Welch

(57) ABSTRACT

A combination of a focusing element, and a filtering element which naturally adjusts the cross-sectional area of a beam of electromagnetic radiation passed through the focusing element as a function of wavelength over a specified range of wavelengths, wherein the filtering element is not uniform, but rather varies as a selection from the group consisting of:
  optical density and/or thickness is greatest near the center thereof; and
  optical density and/or thickness is smallest near the center thereof;
and can demonstrate neutral density characteristics outside the specified range of wavelengths. The combination of a focusing element, and a filtering element can optionally be present in an ellipsometer or polarimeter system.

33 Claims, 8 Drawing Sheets

(56) References Cited

U.S. PATENT DOCUMENTS

| | | | |
|---|---|---|---|
| 7,027,156 B2 | 4/2006 | Watts et al. | 356/401 |
| 7,050,162 B2 | 5/2006 | Opsal et al. | 356/237.1 |
| 7,070,405 B2 | 7/2006 | Sreenivasan et al. | 425/174.4 |
| 7,145,654 B2 | 12/2006 | Norton | 356/369 |
| 7,190,525 B2 | 3/2007 | Ito et al. | 359/599 |
| 7,239,391 B2 | 7/2007 | Synowicki et al. | 356/369 |
| 7,248,420 B2 | 7/2007 | Hayashi et al. | 359/719 |
| 7,251,410 B2 | 7/2007 | Ide | 385/140 |
| 7,274,472 B2 | 9/2007 | Bischoff | 356/635 |
| 7,281,921 B2 | 10/2007 | Watts et al. | 425/385 |
| 7,295,313 B1 | 11/2007 | Johs et al. | 356/369 |
| 7,495,762 B2 | 2/2009 | Wang et al. | 356/328 |
| 8,351,036 B1 * | 1/2013 | Liphardt | G01J 4/00 356/369 |
| 8,749,785 B2 * | 6/2014 | Liphardt | G02B 3/00 356/369 |
| 9,921,395 B1 * | 3/2018 | Liphardt | G02B 17/0663 |
| 2004/0032664 A1 | 2/2004 | Miller et al. | |
| 2004/0085882 A1 | 5/2004 | Yamamoto et al. | 369/94 |
| 2005/0247866 A1 | 11/2005 | Plewa | |
| 2006/0164734 A1 | 7/2006 | Hayashi et al. | |
| 2009/0108190 A1 | 4/2009 | Plewa et al. | |
| 2009/0322928 A1 | 12/2009 | Robinson et al. | |

\* cited by examiner

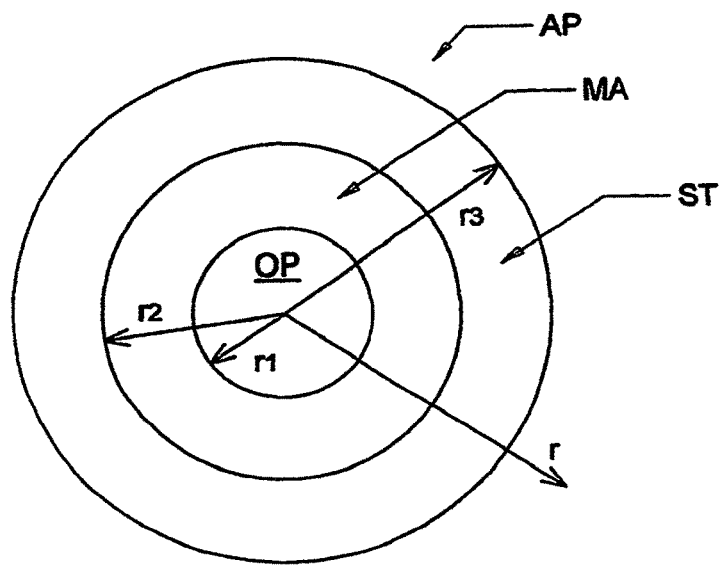
FIG. 1a₁
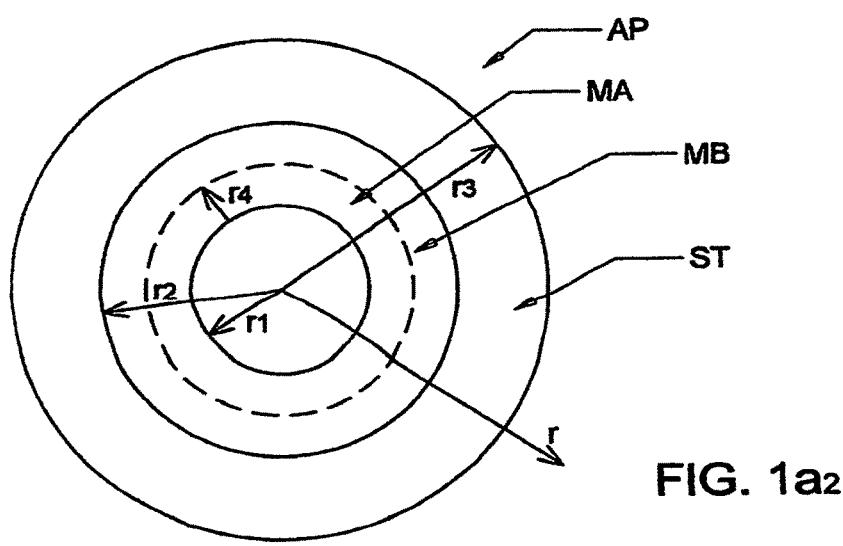
FIG. 1a₂

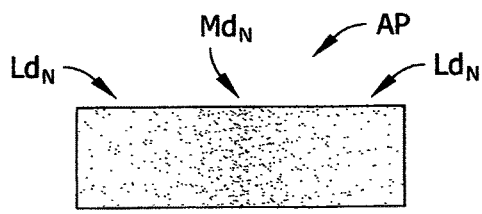
FIG. 1d₁
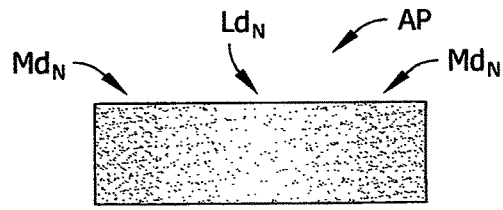
FIG. 1d₂
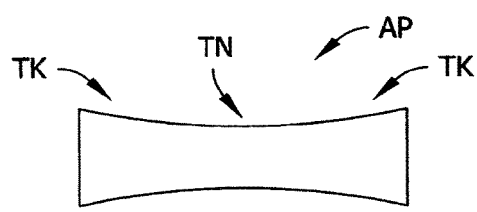
FIG. 1d₃
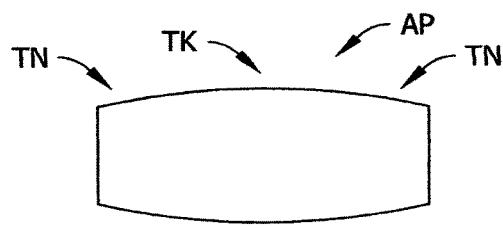
FIG. 1d₄
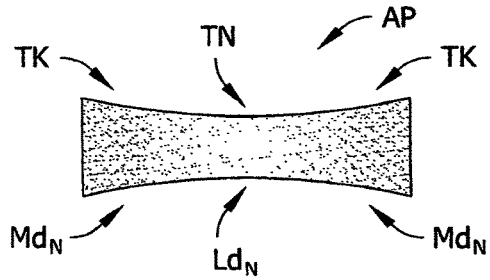
FIG. 1d₅
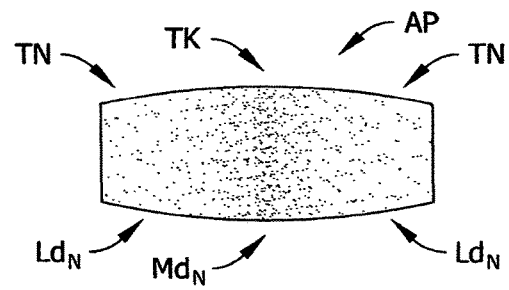
FIG. 1d₆
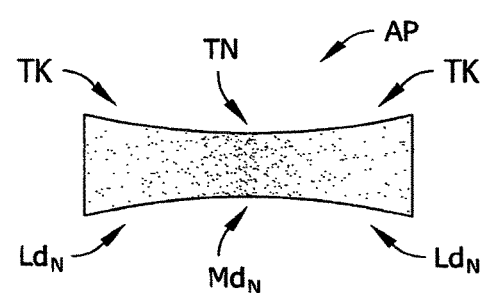
FIG. 1d₇
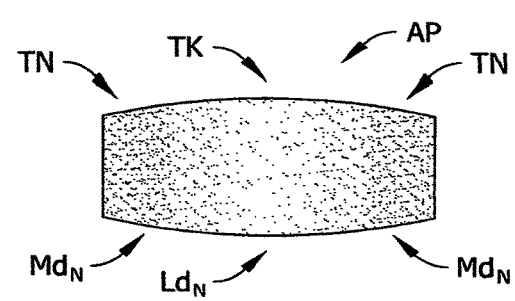
FIG. 1d₈

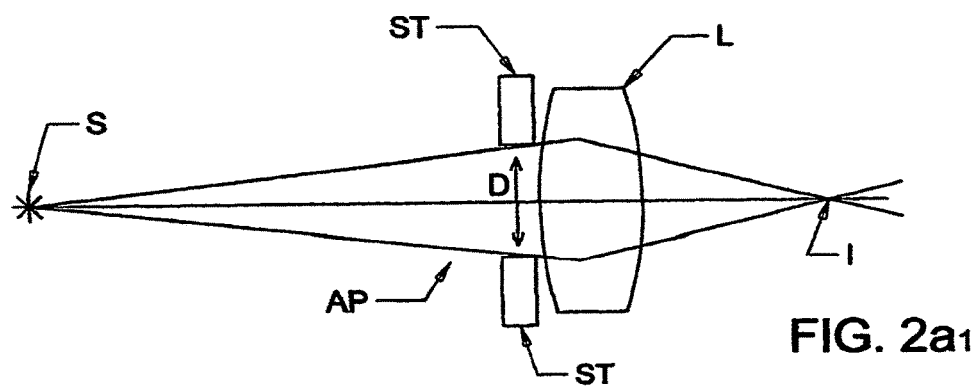
FIG. 2a1
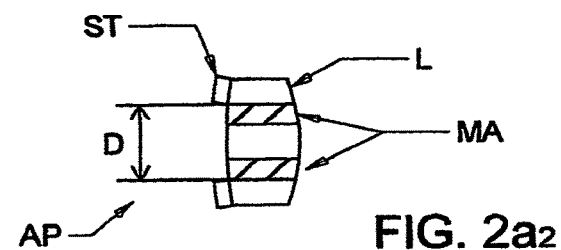
FIG. 2a2
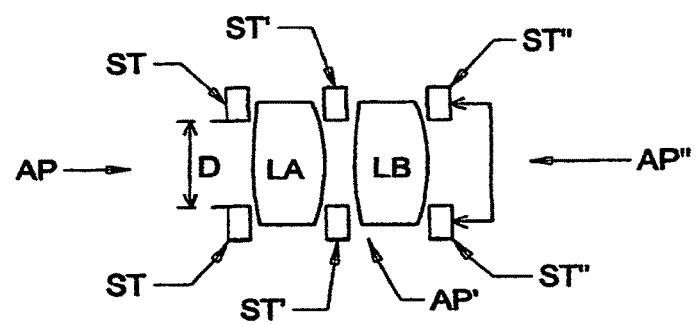
FIG. 2a3

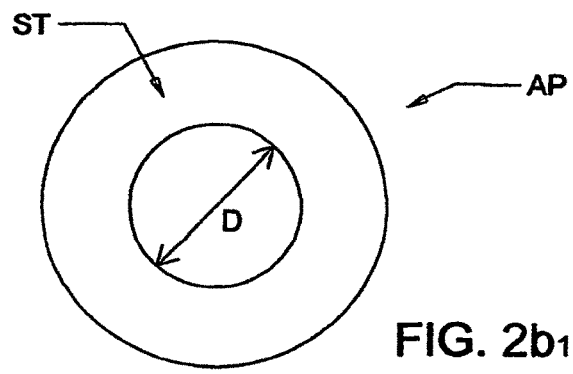
FIG. 2b₁
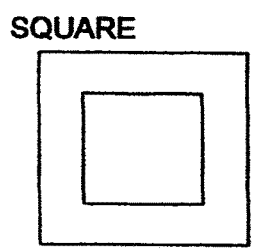
FIG. 2b₂
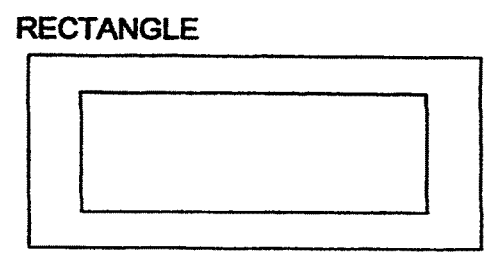
FIG. 2b₃
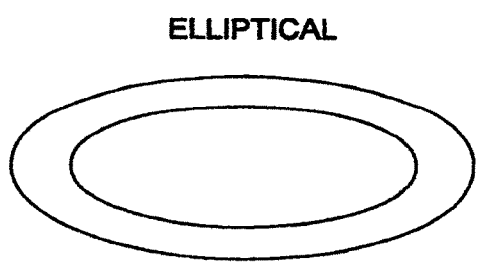
FIG. 2b₄
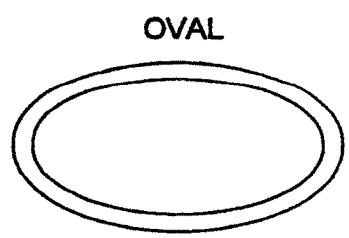
FIG. 2b₅

OPERATION OF AN ELECTROMAGNETIC RADIATION FOCUSING ELEMENT

TECHNICAL FIELD

The present invention relates to a system of aperturing a focusing element by use of a filtering element to arrive at an optimum electromagnetic beam cross-sectional area passed by the filtering element, based on optimizing said cross-sectional area in view of conflicting effects of aberration and diffraction inherent in said focusing element, which, for each wavelength, vary oppositely to one another with electromagnetic beam cross-sectional area. More particularly the present invention is a combination of a focusing element, and a filtering element which can provide neutral density characteristics as a function of wavelength in some wavelengths ranges, and in which the filtering element is not necessarily of uniform optical density and/or thickness, said optical density and/or thickness possibly varying as a selection from the group consisting of:
  optical density and/or thickness is greatest near the center thereof; and
  optical density and/or thickness is smallest near the center thereof.

BACKGROUND

It is known that focusing element, such as refractive lenses and lens systems, cause both diffraction and aberration to occur in a beam of electromagnetic radiation with which is interacts. It is also known that when the effective diameter of a beam of electromagnetic radiation which impinges on a focusing element is adjusted, the effects of diffraction and of aberration are affected oppositely. That is, as the beam cross-sectional area is increased, the effects of diffraction decrease, but the effects of aberration increase. This leads to a realization that, for each wavelength in the beam, there should be a beam cross-sectional area such that the focusing lens performs "optimally". That is, there exists a cross-section area such that increase or decrease in cross-sectional area will cause combined diffraction or aberration to become worse, (ie. cause lens performance to be worse).

It is also well known that attenuation of the intensity of a beam of electromagnetic radiation which is caused to pass through a material is related to the extinction coefficient and thickness of the material via Beer's Law:

$$Io = Ii(e^{-\alpha T}).$$

Therefore, either an increase in the value of extinction coefficient $\alpha$, or a greater thickness (T) of a material, or a combination of both, can cause a greater attenuation of input intensity (Ii) of components of a beam of electromagnetic radiation which passes through a lens. This is to be contrasted with the situation where input Intensity (Ii) is attenuated by reflection or scattering from a surface of an aperture forming material. Further, it is noted that "reflection" implies a specular condition wherein an angle of incidence of an input beam of electromagnetic radiation component is equal to an angle of reflection; whereas "scattering", while still indicating a deflection of a component of an electromagnetic beam away from transmission through a lens, does not have such a limitation on the angle at which a beam component is deflected.

With the present invention in mind a computer search for Patents and Published Applications was conducted. A few references were identified which are interesting as they relate to aberration corrections. For instance, a Patent to Lee et al., U.S. Pat. No. 6,994,808 describes a planar lens which is designed to compensate chromatic aberration. Another Patent to Kimura, U.S. Pat. No. 6,865,025 provides another optical element for application in compensating aberration. And, a Published Patent Application by Miller et al., No. 2004/0032664 describes a color corrected lens. Other Patents and Published Applications identified are:
Published Applications
  2009/0322928;
  2009/0108190;
  2006/0164734;
  2005/0247866;
Patents
  U.S. Pat. Nos. 7,495,762; 7,281,921; 7,248,420;
  U.S. Pat. Nos. 7,274,472; 7,190,525; 5,336,885;
  U.S. Pat. Nos. 7,251,410; 7,070,405; 4,832,464;
  U.S. Pat. Nos. 6,824,813; 7,027,156; 4,650,279.
  U.S. Pat. Nos. 6,449,028; 6,916,584;
  U.S. Pat. Nos. 5,889,593; 6,277,938;

The above cited Patents are not considered to be particularly relevant to a focusing element that optimizes its optical response regarding aberration v. diffraction on a per wavelength basis.

Further identified are U.S. Pat. Nos. 8,749,785 and 8,351,036 which while relevant do not focus on application of filter material which operates to control an effective lens diameter in a specified range of wavelengths, but acts as a neutral density outside thereof.

It is also well known that various materials and stacks of materials or the like have different Transmission v. wavelength characteristics. Patents known by the Inventor herein which are relevant are: U.S. Pat. Nos. 7,239,391; 7,295,313; 6,940,595; and 6,636,309. However, while said general knowledge that stacked materials present with specific response to different wavelengths exists, application of the effect as taught in the present Application is not found in the known prior art. This is particularly the case where application of aperturing and focusing of electromagnetic beams by a present invention system for improving the operation of a focusing element as a function of wavelength is applied in an ellipsometer, polarimeter or the like system.

Japanese Patent Application JP 2003-091862 by Kitabayashi, and a Published Application by Yamamoto et al. 2004/0085882 are also identified. The Kibabayashi 501 reference describes processing two laser beams of electromagnetic radiation in a CD-DVD system, said two beam being provided by solid state laser sources. Said two laser beams, however, are elliptical in cross-sectional shape as they exit the sources thereof, which is not optimum for us in CD-DVD systems. Kibabayashi 501 explains that beams of a circular cross-sectional shape are preferable in CD-DVD systems, and the Kibabayashi 501 reference provides a required Prism (3) in its system that is designed to make changes to one of the two beams which is of a specific wavelength, to make it be substantially circular in cross-section. Importantly, nothing in Kibabayashi 501 remotely suggests removing said Prism (3) as to do so would render the Kibabayashi 501 system inoperable, and nothing in the present invention remotely suggests the presence of such a beam shaping element. However, necessary as it is in Kibabayashi 501, said prism (3) does not operate so successfully at a second wavelength, and this is why the Kibabayashi 501 reference provides for its dichroic, (ie. wavelength absorbing), filter (63) to also be present. Said dichroic filter makes the second wavelength beam substantially circular by presenting an essentially elliptical shape filter region therein to the beam. Also importantly, said Kibabayashi 501 dichroic filter (63) is designed to, at said second wavelength, provide a substantially circular beam exiting therefrom which was not fully affected by that Prism therein (3). It's presence does NOT serve to act on a multiplicity of wavelengths without need of additional elements as does the filter in the present invention, as will be discussed in the Disclosure Section of the Specification.

It is also of interest to consider that Kibabayashi 501 inventor could beneficially add the present invention to its system to provide optimized beam diameters at the two wavelengths it uses for CD and DVD operation. However, Kibabayashi 501 does not remotely suggest this at all, as it does not even mention correcting for diffraction of a beam.

Finally, Patents disclosing other approaches, (eg. apodizing filters, spatial filters, graded lens etc.), to improving imaging performance in metrology systems by adjusting the index of lens material index are:

U.S. Pat. No. 5,859,424 to Norton;
U.S. Pat. No. 6,738,138 to Wei;
U.S. Pat. No. 7,145,654 to Norton; and
U.S. Pat. No. 7,050,162.

Need exists for a system which provides wavelength specific material response mediated aperturing and focusing of electromagnetic beams, on a wavelength by wavelength basis, to the end that an optimum beam diameter, in view of both diffraction and aberration effects is approached over a range of wavelengths so that the operation of the lens element is improved, and in which a filtering element is also present which is not necessarily of uniform optical density and/or thickness, said optical density and/or thickness varying as a selection from the group consisting of:
  optical density and/or thickness is greatest near the center thereof; and
  optical density and/or thickness is smallest near the center thereof;
and can demonstrate neutral density characteristics outside the specified range of wavelengths. The combination of a focusing element, and a filtering element can optionally be present in an ellipsometer or polarimeter system.

DISCLOSURE OF THE INVENTION

The present invention is a system for improving the operation of a focusing element as a function of wavelength, to improve the performance of the focusing element. Said system comprises, in either order:
  a) a focusing element for focusing an electromagnetic beam, selected from the group consisting of:
    a lens; and
    a lens system comprising at least two elements; and
  b) a filtering element for naturally adjusting the effective cross-sectional area of a transmitted beam of electromagnetic radiation, as a function of wavelength for a multiplicity thereof, said focusing element and said filtering element being functionally associated.

The design criteria of said filtering element is that the effective cross-sectional area of the electromagnetic beam passed by said filtering element to said focusing element is naturally adjusted with respect to wavelength for each wavelength in a range of a multiplicity thereof, such that the performance of the focusing element is rendered approximately optimum in view of an inherent tradeoff between diffraction and aberration effects as a function of electromagnetic beam cross-sectional area. Outside said range of a multiplicity of wavelengths, however, the present invention provides that the filtering element can be neutral density.

The filtering element can absorb electromagnetic radiation of some wavelengths but not others, can reflect electromagnetic radiation of some wavelengths but not others, and/or scatter electromagnetic radiation of some wavelengths but not others.

The filtering element performs at least two selections from the group consisting of:
  it passes;
  it reflects;
  it scatters;
electromagnetic radiation of some wavelengths but not others.

For each wavelength, the focusing element aberration effects increase with the effective cross-sectional area of a beam of electromagnetic radiation directed thereto, and for each wavelength, focusing element diffraction effects decrease with the effective cross-sectional area of a beam of electromagnetic radiation directed thereto.

The effective cross-sectional area of a beam of electromagnetic radiation directed thereto, is naturally adjusted by said filtering element to be approximately optimum based on determining a cross-over point between increasing aberration and decreasing diffraction effects as a function of said cross-sectional area, for at least one wavelength.

The cross-sectional area can be of a shape selected from the group consisting of:
  circular;
  square;
  rectangular;
  oval; and
  elliptical;
wherein progressively greater "effective radii" can be defined, referenced to a common origin. Different materials can be present between adjacently positioned radii.

The focusing element and filtering element can comprise a modular lens and a modular filtering element, or can comprise an integrated lens and filtering element.

The focusing element and filtering element can comprise a modular lens system comprising at least two modular lens elements and at least one modular filtering element positioned at a location selected from the group:
  before a lens element;
  after a lens element;
  between said at least two lens elements.

The focusing element and filtering element can comprise a modular lens system comprising at least two modular lens elements and at least one filtering element integrated into at least one of said lens elements at a location selected from the group:
  before said lens element;
  after said lens element.

The focusing element and filtering element can comprise a modular lens system comprising at least two modular lens elements, and at least one filtering element integrated into both lens elements, each thereof being at a location selected from the group:
  before said lens element;
  after said lens element.

The filtering element can be of a constant optical density and/or thickness over its area, or not of a constant over its area, and/or can comprise at least two concentric regions of different materials, wherein a first material is present between a first effective radius and a second greater radius, and a second material is present between said second radius and a third even greater effective radius, all centered about a common origin.

As a relevant application of a present invention system as described above is in ellipsometer and polarimeter or the like systems, it is disclosed that such systems comprise:
   a source of electromagnetic radiation;
   a polarization state generator;
   a stage for supporting a sample;
   a polarization state analyzer; and
   a data detector.
Said ellipsometer, polarimeter or the like system further comprises, at least prior to said stage for supporting a sample a system for improving the operation of a focusing element as a function of wavelength, to improve the performance of the focusing element comprising, in either order:
   a) a focusing element for focusing an electromagnetic beam, selected from the group consisting of:
      a lens; and
      a lens system comprising at least two elements; and
   b) a filtering element for naturally adjusting the effective cross-sectional area of a transmitted beam of electromagnetic radiation, as a function of wavelength for a multiplicity thereof;
said focusing element and said filtering element being functionally associated.

The design criteria of said filtering element is that the effective cross-sectional area of the electromagnetic beam passed by said filtering element to said focusing element is naturally adjusted with respect to wavelength for each wavelength in a range of a multiplicity thereof, such that the performance of the focusing element is rendered approximately optimum in view of an inherent tradeoff between diffraction and aberration effects as a function of electromagnetic beam cross-sectional area. Outside said range of a multiplicity of wavelengths, however, the present invention provides that the filtering element can be neutral density.

The filtering element can absorb electromagnetic radiation of some wavelengths but not others.

The filtering element can reflect electromagnetic radiation of some wavelengths but not others.

The filtering element can scatter electromagnetic radiation of some wavelengths but not others.

The filtering element can perform at least two selections from the group consisting of:
   it passes;
   it reflects;
   it scatters;
electromagnetic radiation of some wavelengths but not others, wherein, for each wavelength, focusing element aberration effects increase with the effective cross-sectional area of a beam of electromagnetic radiation directed thereto and wherein for each wavelength, focusing element diffraction effects decrease with the effective cross-sectional area of a beam of electromagnetic radiation directed thereto.

The effective cross-sectional area of a beam of electromagnetic radiation directed thereto, is then naturally adjusted by said filtering element to be approximately optimum based on determining a cross-over point between increasing aberration and decreasing diffraction effects as a function of said cross-sectional area, for at least one wavelength.

The focusing element and filtering element can comprise a modular lens and a modular filtering element.

The focusing element and filtering element can comprise an integrated lens and filtering element.

The focusing element and filtering element can comprise a modular lens system comprising at least two modular lens elements and at least one modular filtering element positioned at a location selected from the group:
   before a lens element;
   after a lens element;
   between said at least two lens elements.

The focusing element and filtering element can comprise a modular lens system comprising at least two modular lens elements and at least one filtering element integrated into at least one of said lens elements at a location selected from the group:
   before said lens element;
   after said lens element.

The focusing element and filtering element can comprise a modular lens system comprising at least two modular lens elements, and at least one filtering element integrated into both lens elements, each thereof being at a location selected from the group:
   before said lens element;
   after said lens element.

The filtering element can be of a constant thickness over its area, or not constant over its area and/or can comprise at least two concentric regions of different materials, wherein a first material is present between a first effective radius and a second greater radius, and a second material is present between said second radius and a third even greater effective radius, all centered about a common origin.

It is mentioned that one way of thinking about the present invention filtering element, is that it is a wavelength dependent system for naturally adjusting a numerical aperture size. And, note that the present invention provides the same filtering characteristics at each radial circumference through a 360 degree rotation about said common origin.

Many of the same features as Claimed herein were originally disclosed in U.S. Pat. No. 8,749,785. However, for Examiner convenience, it is pointed out that an emphasis in the present Claims is that an applied filtering element is not necessarily of uniform optical density and/or thickness, and it can be configured as a selection from the group consisting of:
   optical density and/or thickness is greatest near the center thereof; and
   optical density and/or thickness is smallest near the center thereof.

It is, however, within the scope of the present claims to provide a system in which the filtering element is of uniform optical density, in at least some regions thereof. It is an important point that while the presently Claimed system can be designed to operate best to control beam diameter in a specified limited range in a range of a multiplicity wavelengths, said system as now disclosed can be operated, in or outside said limited range of wavelengths. Further, and importantly, the presently Claimed system can be designed to be an optical filter that provides neutral density filter characteristics, or has tailored transmissive characteristics for wavelengths outside said limited range of wavelengths in which it operates best. This is considered to be significant in the Presently Claimed invention.

The rational of the present invention is that in ellipsometric applications it is at times convenient to leave the present invention in place during measurements at wavelengths outside the range of wavelengths at which it approximately optimizes beam diameter, and utility arises from tailoring the characteristics thereof in said additional wavelength ranges.

The present invention also is a method of applying a system for improving the operation of a focusing element as a function of wavelength for a multiplicity thereof in a given range thereof comprising:
   a) providing a system as described above;

b) applying said system for improving the operation of a focusing element as a function of wavelength for a multiplicity thereof in a given range thereof, at wavelengths outside said given range thereof for which it improves the operation of a focusing element as a function of wavelength for a multiplicity thereof in said given range.

Said method can involve the filtering element not being of uniform optical density, said optical density varying as a selection from the group consisting of: the optical density and/or thickness is greatest near the center thereof; and the optical density and/or thickness is smallest near the center thereof.

Said method as can involve the filtering element acting as a substantially neutral density filter for wavelengths outside said given multiplicity range of wavelengths.

The present invention will be better understood by reference to the Detailed Description Section of this Specification, in combination with the Drawings.

BRIEF DESCRIPTION OF THE DRAWINGS

FIGS. 1a1 and 1a2 show an aperture which is made from various materials at various radial extents.

FIG. 1b' shows a non-uniform optical density or thickness in filter characteristic in other than optimum wavelength range, when transmission is greatest near the center of the filter.

FIG. 1c' shows an expanded neutral density (NDF) region compared to FIG. 1c, indicating benefit can obtain by tailored optical density or thickness outside the optimum wavelength range.

FIG. 1d1 shows a constant thickness Aperture (AP), which has a graded Optical Density that is maximum (Mdn) at the center thereof and minimum (Ldn) laterally.

FIG. 1d2 shows a constant thickness Aperture (AP), which has a graded Optical Density that is minimum (Ldn) at the center thereof and maximum (Mdn) laterally.

FIG. 1d3 shows an Aperture (AP) with varying Thickness, which is a minimum (Tn) at the center thereof and maximum laterally (Tk).

FIG. 1d4 shows an Aperture (AP) with varying Thickness, which is a maximum (Tk) at the center thereof and minimum (Tn) laterally.

FIG. 1d5 shows an Aperture (AP) with varying Thickness and Optical Density, which are both minimum (Tn) (Ldn) at the center thereof and maximum (Tk) (Mdn) laterally.

FIG. 1d6 shows an Aperture (AP) with varying Thickness and Optical Density, which are both maximum (Tk) (Mdn) at the center thereof and minimum (Tn) (Ldn) laterally.

FIGS. 1d7 and 1d8 show an Aperture (AP) with Thickness and Optical Densities which vary oppositely for lateral to central locations.

FIG. 2a1 shows a side view of a modular lens (L) with an aperture (AP) placed just therebefore.

FIG. 2a2 shows a side view of an integrated lens (L) and aperture (AP).

FIG. 2a3 a lens (L) can be a lens system comprising a plurality of elements.

FIG. 2b1 shows a front view of a circular lens (L) and aperture (AP).

FIGS. 2b2-2b5 show front views of various alternative lens shapes.

FIG. 3 shows a plot of beam energy as a function of aperture (AP) Radius (r).

FIG. 4 demonstrates how aperture (PA) opening radius (r) affects resolution capability.

FIG. 5 demonstrates an ellipsometer and polarimeter (E) or the like system.

DETAILED DESCRIPTION

Turning now to the Drawings, FIG. 1a1 shows an aperture (AP) which is made from various materials at various radial (r) extents. Radius (r1) identifies a opening through which a electromagnetic radiation of a given wavelength can pass. Radius (r2) shows a region of the aperture, outside the radius (r1), which is made of material (A), and radius (r3) shows a region beyond radius (r2) which is a beam stopper (ST). FIG. 1a2 also shows that the aperture (AP) can comprise additional areas made of various other filtering materials, (eg. (MB) between r1 and r4). Additional concentric rings of different filtering materials can be present and the Drawings are to be considered demonstrative and not limiting. A similar plot results for each wavelength. Further, note that the material present between indicated radii r1 and r2 is the same through said 360 degrees, as is the different material between radii r2 and r4. Support for this is found in the present Application FIGS. 1a1 and 1a2. It is noted that this is very different than what is disclosed by Kibabayashi 501 FIG. 3 which shows that the dichroic filter thereof has an elliptical shaped filter region in order to shape an elliptical shaped beam to be more circular. There is no similar motivation for such filter design in the present invention. The motivation for the present invention filtering approach is that there is a tradeoff between diffraction and aberration effects as a function of electromagnetic beam cross-sectional area presented to a lens focusing element, and this cross-sectional area tradeoff varies with wavelength. (And further note that Kibabayashi 501 does not even mention beam diffraction). The filtering material, (eg. (MA), (MB), (ST)), in the present invention serves to fashion beam cross-sectional diameter so that, for each wavelength present therewithin, the diameter, and hence cross-sectional beam area, is approximately optimum in view of how a focusing element handles it. In addition, the filtering material in the present Application is defined as not necessarily being of uniform optical density and/or thickness, said optical density and/or thickness varying as a selection from the group consisting of:

optical density and/or thickness is greatest near the center thereof; and optical density and/or thickness is smallest near the center thereof.

Figure 1B:
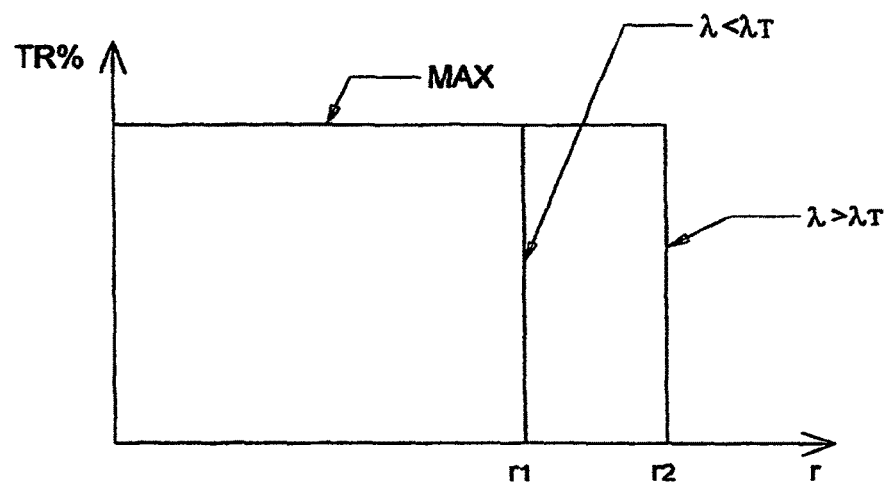
FIG. 1b shows that different wavelengths "see" a different aperture (AP) cross-sectional area.
Figure 1C:
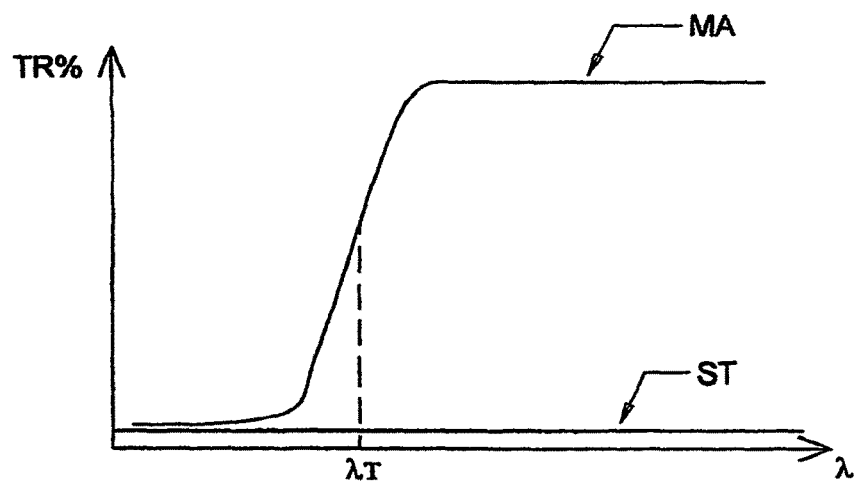
FIG. 1c is shows transmission characteristics for materials (A) and (ST) in FIG. 1a which result in FIG. 1b operational characteristics.
Figure 1B:
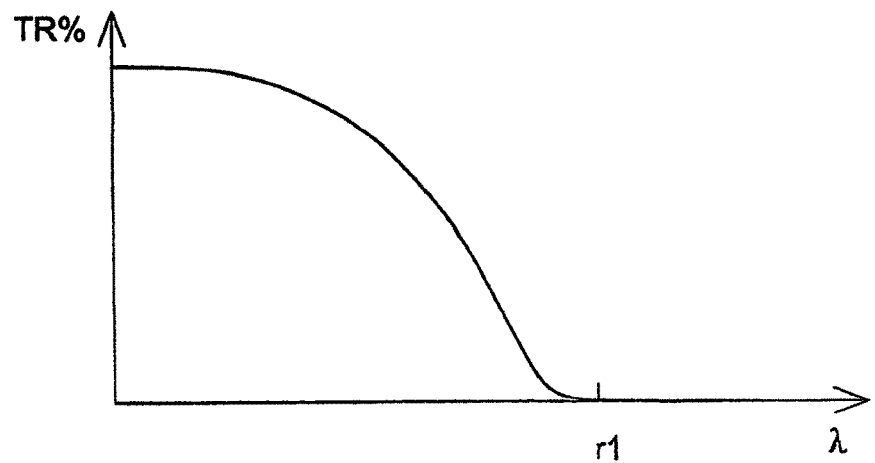
Figure 1C:
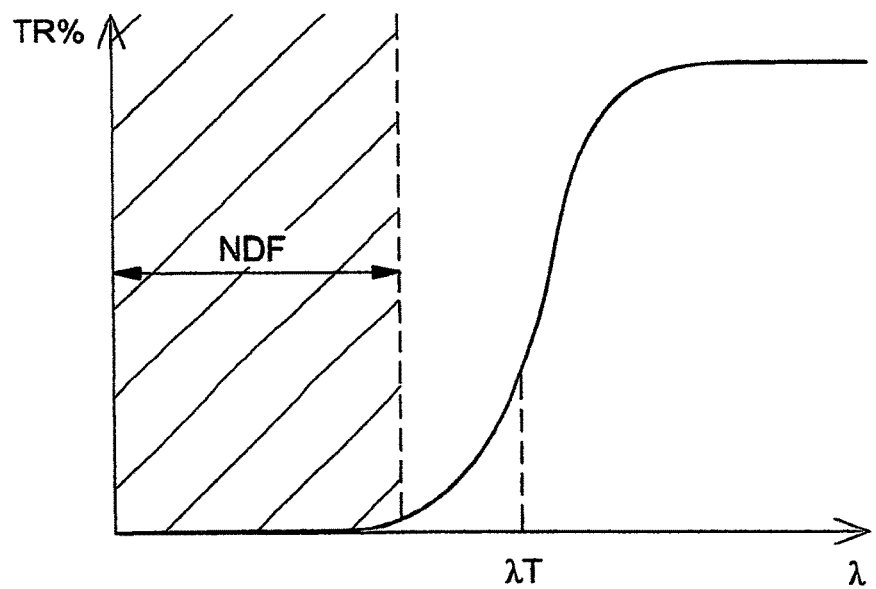

FIG. 1c shows transmission characteristics for material (A) and beam stopper (ST) in FIG. 1a1 which result in FIG. 1b operational characteristics. FIG. 1b shows that different wavelengths "see" a different aperture (AP) cross-sectional area, (eg. an opening radius varies between (r1) and (r2) with wavelength in an optimum operational design range). This is because of the wavelength dependent response of material (A). It will be appreciated that Figures like FIGS. 1b and 1c, but for a FIG. 1a2 embodiment also result, but with different Percent of Transmission (TR %) for the region between (r4) and (r2) based on the characteristics of material (ST). Any number of such Figures result based on the number of regions of different Materials, (eg. (MA), (Mb) and additional (Mc) etc.), and it is not believed necessary to show a multiplicity of embodiments in view of the examples provided by FIGS. 1A1, 1A2, 1b and 1c. However, FIG. 1b' is included to show a non-uniform optical density or thickness in filter characteristic in other than optimum wavelength range, (ie. beyond r1 in FIG. 1b is optimum and 0.0 to r1 is design non-optimum range), when transmission is greatest near the center of the filter. FIG. 1c' is included to show an enhanced neutral density filter (NDF) region of a said filter, indicating benefit can still obtain outside, (ie. to the left in FIG. 1c), of the design optimum operational wavelength range to the right thereof. FIGS. 1b' and 1c' focus on a primary benefit of the present invention, not previously disclosed.

As it is of importance to the Present Invention, FIG. 1d1 is included to show a constant thickness Aperture (AP), which has a graded Optical Density that is maximum (Mdn) at the center thereof, and minimum (Ldn) laterally. This corresponds to the leftmost Transmission (TR %) region in FIG. 1b'.

FIG. 1d2 shows a constant thickness Aperture (AP), which has a graded Optical Density that is minimum (Ldn) at the center thereof and maximum (Mdn) laterally.

Figure 3:
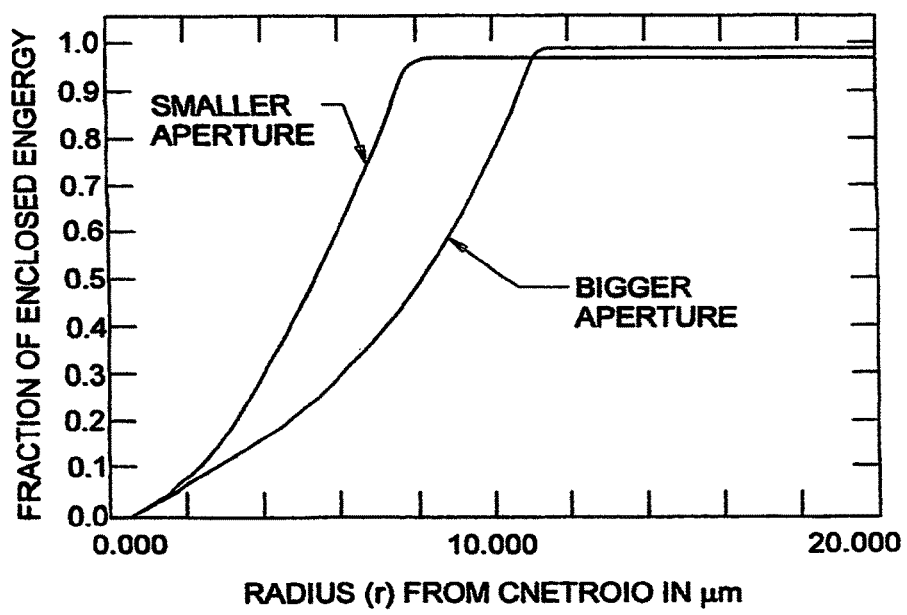

FIG. 1d3 shows an Aperture (AP) with varying Thickness, which is a minimum (Tn) at the center thereof and maximum laterally (Tk).

Figure 4:
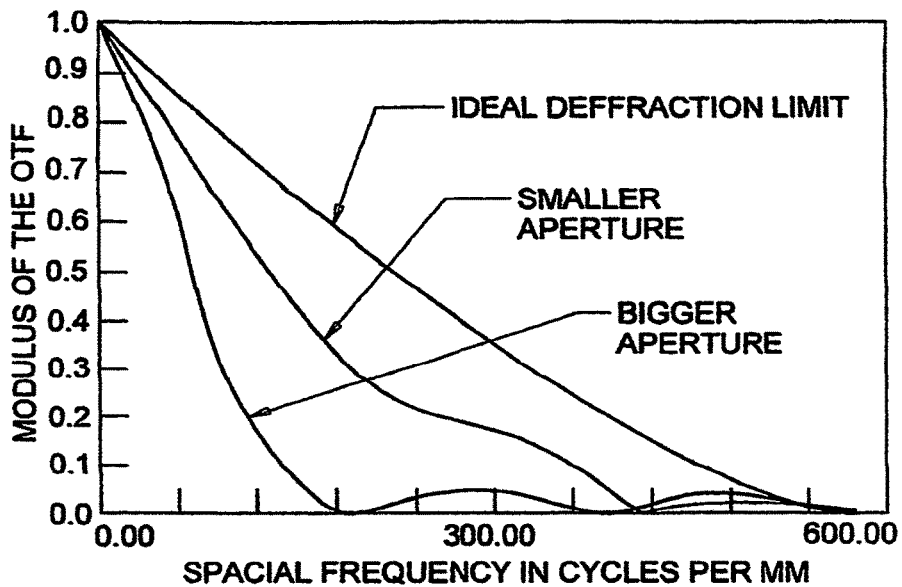

FIG. 1d4 shows an Aperture (AP) with varying Thickness, which is a maximum (Tk) at the center thereof and minimum (Tn) laterally.

Figure 5:
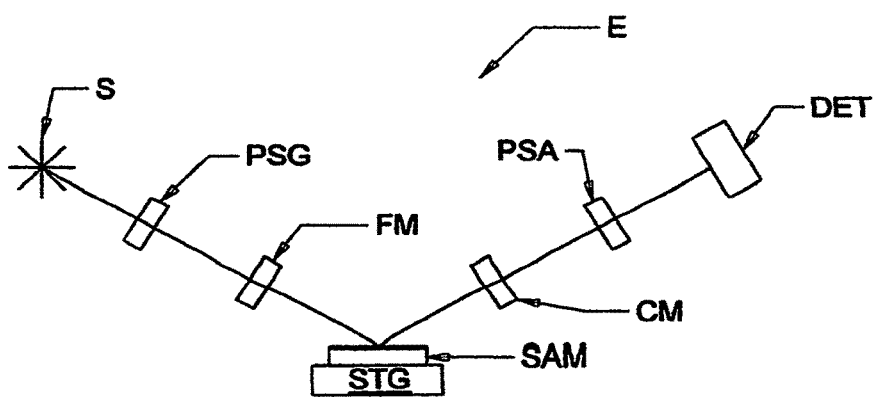

FIG. 1d5 shows an Aperture (AP) with varying Thickness and Optical Density, which are both minimum (Tn) (Ldn) at the center thereof and maximum (Tk) (Mdn) laterally.

FIG. 1d6 shows an Aperture (AP) with varying Thickness and Optical Density, which are both maximum (Tk) (Mdn) at the center thereof and minimum (Tn) (Ldn) laterally.

FIGS. 1d7 and 1d8 show an Aperture (AP) with Thickness and Optical Densities which vary oppositely for lateral to central locations. It is noted that a Neutral Density Filter effect can be achieved by this arrangement.

It is to be understood that the Optical Densities, indicated as varying densities of dots in FIGS. 1d1, 1d2, 1d3 and 1d4, are for wavelengths outside the range of wavelengths in which the Aperture size decreases or increases radially, and for which wavelengths the performance of said lens is rendered approximately optimum in use, with respect to aberration and diffraction.

FIG. 2a1 shows a side view of a Lens (L) with an aperture (AP) placed just therebefore. FIG. 2b1 shows a front view of said lens (L) and aperture (AP). As indicated by FIGS. 1a1-1c, the aperture (AP) diameter (D) varies with wavelength. FIGS. 2b2-2b5 show front views of various alternative lens shapes, namely square, rectangular, oval and elliptical. FIG. 2a2 shows that the lens (L) and aperture (AP) can be merged into an integrated embodiment. Both the FIG. 2a1 modular, and FIG. 2a2 integrated embodiments are disclosed as the Present Invention in this Disclose. FIG. 2a3 demonstrates that, for the purpose of this disclosure, a lens (L) can be, but need not be, a lens system comprising a plurality of elements, (eg. at least (LA) and (LB) elements). FIG. 2a3 also demonstrates that an aperture (AP) (AP') (AP") can alternatively be placed either before (AP) or after (AP') a Lens (LA), or between (AP") two elements (LA) (LB), or simultaneously at any selected multiple of said locations. This is the case regardless of the number of Lenses and Filters present. Note, FIG. 2a3 is not to be interpreted to imply that a lens system can not be comprised of more than two elements.

Figure 2C:
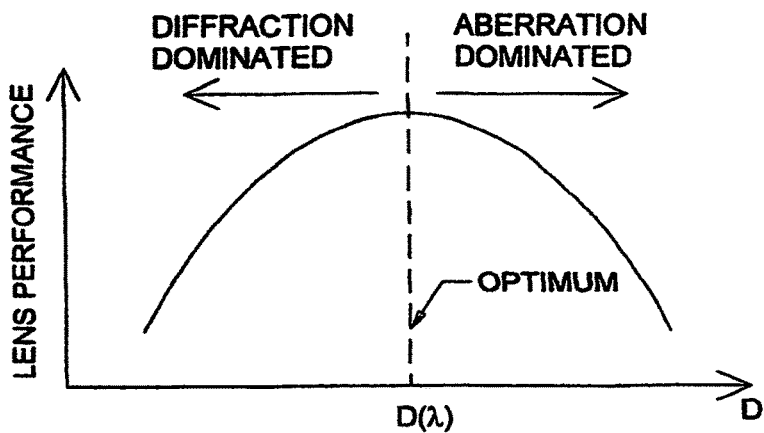
FIG. 2c shows the primary desired effect of the present invention.

FIG. 2c shows the primary effect of a present invention system. Lens performance criteria is optimized in view of offsetting Wavelength dependent Aberration and Diffraction effects by Changing effective Diameter (D) of a beam. Larger or smaller diameters result in a less than optimum Lens Performance. FIG. 2c optimum design operational wavelength region is to the right therein. Very importantly, the Present Invention Claimed herein focuses applying-such systems as represented by FIG. 2c in previously undisclosed "non-optimum" operational design wavelength regions, such as to the left in FIGS. 1b' and 1c' for example). This application has not been previously suggested.

FIG. 3 shows a plot of beam energy as a function of aperture (AP) radius (r).

FIG. 4 demonstrates how aperture (AP) opening radius (r) affects resolution capability.

FIG. 5 demonstrates that an ellipsometer and polarimeter or the like system (E) generally comprises a source (S) of electromagnetic radiation, a polarization state generator (PSG), a stage (STG) for supporting a sample (SAM), a polarization state analyzer (PSA) and a data detector (DET). The polarization state generator (PSG) and polarization state analyzer (PSA) can each comprise a polarizer or analyzer respectively, and either can further comprise a compensator. Note that focusing (FM) and collimating (CM) are also shown. The present invention FIGS. 2a1 2a2 and 2a3 refractive lens (L) and aperture (A) (A') (A") can be applied at these locations.

It is noted that the terminology "naturally adjusted" as used in this Disclosure is to be interpreted to mean that a filter material optically responds to different wavelengths differently, so that an effective aperture diameter, and therefore the cross-sectional area of a beam of electromagnetic radiation interacting with an associated focusing element, is different for different wavelengths. The purpose being to provide a beam cross-sectional area which is more "optimum" in view conflicting aberration and diffraction criteria, and therefore improve the operation of the focusing element.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A system for improving the operation of a lens as a function of wavelength for a multiplicity of wavelengths comprising:
    a) a lens for focusing an electromagnetic beam; and
    b) an aperture having material for naturally adjusting the effective cross-sectional area of a transmitted beam of electromagnetic radiation, as a function of wavelength;
    said lens and said aperture being functionally associated as a selection from the group consisting of:
    said lens and aperture are separate elements in either order; and
    said lens and aperture are an integrated system;
    wherein the aperture provides that the effective cross-sectional area of the electromagnetic beam passed by said aperture is naturally adjusted as a result of how the material of said aperture optically responds with respect to wavelengths for each wavelength in a specified limited range of a multiplicity of wavelengths, such that the performance of the lens is rendered approximately optimum with respect to diffraction and aberration effects as a function of electromagnetic beam cross-sectional area in said specified limited range of a multiplicity of wavelengths;

said aperture also being at least partially transmissive outside said specified limited range of said multiplicity of wavelengths wherein for each wavelength in said specified limited range of said multiplicity of wavelengths the lens is rendered approximately optimum with respect to diffraction and aberration effects;

the improvement being that:

said aperture, which is constructed with at least two concentrically positioned materials to provide transmissive characteristics, as a function of wavelength, resulting from optical density and/or thickness, each independently being substantially greater, or smaller, centrally in said aperture and which decreases or increases radially, respectively, outside said specified limited range of a multiplicity of wavelengths wherein performance of said lens is rendered approximately optimum with respect to diffraction and aberration.

2. A system as in claim 1, wherein the aperture absorbs electromagnetic radiation of some wavelengths but not others.

3. A system as in claim 1, wherein the aperture reflects electromagnetic radiation of some wavelengths but not others.

4. A system as in claim 1, wherein the aperture scatters electromagnetic radiation of some wavelengths but not others.

5. A system as in claim 1, wherein an additional lens is present before or after the already present lens in that, in use, electromagnetic radiation passing therethrough encounters the additional lens first or second, respectively.

6. A system as in claim 1, wherein, for each wavelength, lens aberration effects increase with the effective cross-sectional area of a beam of electromagnetic radiation directed thereto.

7. A system as in claim 1, wherein, for each wavelength, lens diffraction effects decrease with the effective cross-sectional area of a beam of electromagnetic radiation directed thereto.

8. A system as in claim 1 wherein the effective cross-sectional area of a beam of electromagnetic radiation directed thereto, is naturally adjusted by said aperture to be approximately optimum based on determining a cross-over point between increasing aberration and decreasing diffraction effects as a function of said cross-sectional area, for at least one wavelength.

9. A system as in claim 1, wherein the aperture cross-sectional area is of a shape selected from the group consisting of:
circular;
square;
rectangular;
oval; and
elliptical.

10. A system as in claim 1, wherein the lens and aperture are selected to comprise separate elements.

11. A system as in claim 1, wherein the lens and aperture are selected to comprise an integrated lens and aperture.

12. A system as in claim 1, in which the aperture and lens are selected to comprise separate elements, and the aperture is positioned before said lens in that, in use electromagnetic radiation passing therethrough encounters the aperture first.

13. A system as in claim 1, in which the aperture and lens are selected to comprise separate elements, and the aperture is positioned after said lens in that, in use electromagnetic radiation passing therethrough encounters the lens first.

14. A system as in claim 1, wherein an additional lens is present and wherein the aperture, which is selected to be a separate element, is present at a location between said lenses.

15. A system as in claim 1, wherein the aperture, which is selected to be a separate element, is of a constant thickness over its area.

16. A system as in claim 1, wherein the aperture, which is selected to be a separate element, thickness is not a constant over its area.

17. A system as in claim 1, wherein the aperture, which is selected to be a separate element, comprises at least two concentric regions of different materials, wherein a first material is present between a first effective radius and a second greater effective radius, and a second material is present between said second greater effective radius and a third even greater effective radius, all centered about a common origin.

18. A system as in claim 1, which further comprises:
a source of electromagnetic radiation;
a polarization state generator;
a stage for supporting a sample;
a polarization state analyzer; and,
a detector of electromagnetic radiation,
wherein said system for improving the operation of a lens as a function of wavelength for a multiplicity of wavelengths is positioned between said source of electromagnetic radiation and said stage for supporting a sample; and,
the system is an ellipsometer or polarimeter.

19. A system for naturally improving the operation of a lens as a function of wavelength for a limited range of wavelengths comprising:
a) a lens for focusing an electromagnetic beam;
b) an aperture having material for naturally adjusting the effective cross-sectional area of a transmitted beam of electromagnetic radiation, as a function of wavelength;
said lens and said aperture being functionally associated as a selection from the group consisting of:
said lens and aperture are separate elements in either order; and
said lens and aperture are an integrated system;
wherein said aperture provides that the effective cross-sectional area of the electromagnetic beam passed by said aperture is naturally adjusted as a result of how the material of said aperture optically responds with respect to wavelength for a limited range of wavelengths in a multiplicity of wavelengths, such that the performance of the lens is rendered approximately optimum with respect to diffraction and aberration effects as a function of electromagnetic beam cross-sectional area; and
wherein said aperture is comprised of at least one material that acts as a neutral density filter for wavelengths outside said limited range of wavelengths as a result of radial aperture thickness and/or optical density variation.

20. A system as in claim 19, which further comprises:
a source of electromagnetic radiation;
a polarization state generator;
a stage for supporting a sample;
a polarization state analyzer; and,
a detector of electromagnetic radiation, wherein said system for improving the operation of a lens as a function of wavelength for a multiplicity of wavelengths is positioned between said source of electromagnetic radiation and said stage for supporting a sample; and, the system is an ellipsometer or polarimeter.

21. A system for improving the operation of a lens as a function of wavelength for a multiplicity of wavelengths, comprising,
a) a lens for focusing an electromagnetic beam; and
b) an aperture having material for naturally adjusting the effective cross-sectional area of a transmitted beam of electromagnetic radiation, as a function of wavelength;
said lens and said aperture being functionally associated as a selection from the group consisting of:
separate lens and aperture elements in either order; and
said an integrated system of lens and aperture;
wherein said aperture provides that the effective cross-sectional area of the electromagnetic beam passed by said aperture is naturally adjusted as a result of how the material of said aperture optically responds with respect to wavelength over a specified limited range of wavelengths in a multiplicity of wavelengths, such that the performance of the lens is rendered approximately optimum with respect to diffraction and aberration effects as a function of electromagnetic beam cross-sectional area;
the improvement being that:
the aperture comprises at least one material that is not of radial uniform thickness and/or optical density.

22. A system as in claim 21, in which said multiplicity of wavelengths are in a continuous spectroscopic range of wavelengths.

23. A system as in claim 21, in which the aperture, which is selected to be a separate element, is of uniform optical density.

24. A system as in claim 21, in which the aperture, which is selected to be a separate element, is not of uniform optical density.

25. A system as in claim 21, in which the aperture, which is selected to be a separate element, is not of uniform thickness.

26. A system as in claim 21, in which the aperture, which is selected to be a separate element, is of uniform thickness.

27. A system as in claim 21, which further comprises:
a source of electromagnetic radiation;
a polarization state generator;
a stage for supporting a sample;
a polarization state analyzer; and,
a detector of electromagnetic radiation,
wherein said system for improving the operation of a lens as a function of wavelength for a multiplicity of wavelengths is positioned between said source of electromagnetic radiation and said stage for supporting a sample; and,
the system is an ellipsometer or polarimeter.

28. A system as in claim 21, in which the improvement further comprises:
that said aperture is further distinguished in that it comprises:
at least two concentric regions of different materials;
wherein a first material is present between a first effective radius and a second greater radius; and,
a second material is present between said second effective radius and a third even greater effective radius, all centered about a common origin, thereby providing the same filtering characteristics at each radial circumference through a 360 degree rotation about said common origin; and,
the filter element cross-sectional area is of a shape selected from the group consisting of:
circular;
square;
rectangular;
oval; and,
elliptical.

29. A method of applying a system for improving the operation of a focusing element as a function of wavelength for a multiplicity of wavelengths in a specified limited range of wavelengths comprising:
a) providing a system comprising:
a') a lens for focusing an electromagnetic beam; and
a") an aperture having material for naturally adjusting the effective cross-sectional area of a transmitted beam of electromagnetic radiation, as a function of wavelength;
said lens and said aperture being functionally associated as a selection from the group consisting of:
separate lens and aperture elements in either order; and
said an integrated system of lens and aperture;
wherein said aperture provides that the effective cross-sectional area of the electromagnetic beam passed by said aperture is naturally adjusted as a result of how the material of said aperture optically responds with respect to wavelength for each wavelength in a specified limited range of a multiplicity of wavelengths, such that the performance of the lens is rendered approximately optimum with respect to diffraction and aberration effects as a function of electromagnetic beam cross-sectional area;
said aperture also being at least partially transmissive outside said specified limited range of said multiplicity of wavelengths wherein for each wavelength in said specified limited range of said multiplicity of wavelengths, the lens is rendered approximately optimum with respect to diffraction and aberration effects,
said aperture being constructed with at least one material that provides transmissive characteristics, as a function of wavelength, resulting from its optical density and/or thickness, each independently being substantially greater, or smaller, centrally in said aperture and which decreases or increases radially, respectively, outside said specified limited range of wavelengths wherein performance of said lens is rendered approximately optimum;
b) applying said system for improving the operation of a lens as a function of wavelength for a multiplicity of wavelengths outside said specified limited range of wavelengths for which it improves the operation of a lens as a function of wavelength.

30. A method as in claim 29, in which the aperture, which is selected to be a separate element, is not of uniform optical density.

31. A method as in claim 29, in which the aperture, which is selected to be a separate element, is not of uniform thickness.

32. A method as in claim 29 in which said aperture acts as a substantially neutral density filter for some wavelengths outside said specified limited range of wavelengths.

33. A method as in claim 29, which further comprises:
a source of electromagnetic radiation;
a polarization state generator;
a stage for supporting a sample;
a polarization state analyzer; and, a detector of electromagnetic radiation,
wherein said system for improving the operation of a lens as a function of wavelength for a multiplicity of wavelengths is positioned between said source of electromagnetic radiation and said stage for supporting a sample; and,
the system is an ellipsometer or polarimeter.

* * * * *